United States Patent [19]

Jones

[11] 4,425,560
[45] Jan. 10, 1984

[54] HIGHWAY HAZARD WARNING SIGN SIGNAL

[76] Inventor: Robert W. Jones, 21017 Aberdeen Rd., Rocky River, Ohio 44116

[21] Appl. No.: 383,555

[22] Filed: Jun. 1, 1982

Related U.S. Application Data

[63] Continuation-in-part of Ser. No. 247,733, Mar. 26, 1981, abandoned, which is a continuation of Ser. No. 814,230, Jul. 11, 1977, abandoned.

[51] Int. Cl.³ .......................... B60Q 1/00; H01H 9/00
[52] U.S. Cl. .................................. 340/74; 200/61.57; 340/103
[58] Field of Search .................. 340/74, 76, 82, 71, 340/93, 66, 94, 72, 87, 107, 97, 103, 815.12, 815.24, 815.27; 200/61.54, 61.57; 262/61, 71, 252

[56] References Cited

U.S. PATENT DOCUMENTS

| | | | |
|---|---|---|---|
| 1,574,475 | 2/1926 | Fox | 200/61.57 |
| 2,500,201 | 3/1950 | Porter | 340/103 |
| 2,909,760 | 10/1959 | Short | 340/73 |
| 3,544,743 | 12/1970 | Takei | 200/61.54 |
| 3,748,643 | 7/1973 | Jacobs | 340/71 |
| 3,876,844 | 4/1975 | Scherenberg | 200/61.57 |

FOREIGN PATENT DOCUMENTS

| | | |
|---|---|---|
| 429308 | 5/1926 | Fed. Rep. of Germany ... 200/61.57 |
| 2641006 | 3/1978 | Fed. Rep. of Germany ...... 340/107 |
| 2812797 | 9/1979 | Fed. Rep. of Germany ...... 340/107 |

*Primary Examiner*—Donald J. Yusko
*Attorney, Agent, or Firm*—Woodling, Krost & Rust

[57] ABSTRACT

The present application discloses a Highway Hazard Warning Sign Signal for use on a motor vehicle such as the present day automobile. The invention discloses an apparatus for illuminating a readily visible distinctive sign or signal preferably located on a rear portion of the motor vehicle, to warn an occupant of the following vehicle that the forward vehicle occupant has observed something of sufficient concern that rearwardly located traffic should be warned and alerted to the possibility of an emergency. The distinctive sign signal embodies the illusion of light converging from a perimeter to an attention point and illumination progressively increasing from the perimeter reaching crescendo at the attention point. The embodiment herein discloses a switch actuating mechanism in conjunction with the steering wheel so that the switch may be thrown thereby energizing electrical circuit means to illuminate the warning sign substantially instantaneous with the sense of danger.

4 Claims, 10 Drawing Figures

HIGHWAY HAZARD WARNING SIGN SIGNAL

This patent application is a continuation-in-part of U.S. patent application, Ser. No. 247,733 filed Mar. 26, 1981 entitled Highway Hazard Warning Sign Signal, which in turn was a continuation of U.S. patent application, Ser. No. 814,230 filed July 11, 1977 entitled Highway Hazard Warning Sign Signal, both now abandoned.

The present invention relates to an external signal for a motor vehicle which communicates the observation of an operator of the vehicle of the presence of a highway hazard or of circumstances which may cause the vehicle to be in the path of an actual or potential hazard.

Considering the speed of modern highway traffic, it is an essential part of the present invention that the signal be communicated and recognized in split seconds so that persons viewing the signal may have time for an appropriate emergency reaction response.

The present day vehicle signals are generally familiar to those operators of the same vehicles. At present such signals singly or in combination provide the following indications to persons exterior of the vehicle:

1. The presence of the vehicle (taillight).
2. The intent of the operator of the vehicle to decrease the rate of speed of the vehicle (stoplight or brakelight).
3. The intent of the operator to change the direction of travel of the vehicle (directional signal lights).
4. The presence of the vehicle together with the indication of a hazard associated with the vehicle (both directional signals intermittently energized.)

These just referred to signals generally relate to and are understood by operators of vehicles to relate to their commonly accepted indications. They do not relate to the particular indication of a highway hazard warning.

The familiar brakelight has three very basic safety deficiencies. First the brakelight only performs its function which is to signal that the operator is applying brakes. The brakelight itself communicates no message of an impending need for special alertness. Second, when the operator takes a responsive action to an emergency which does not involve braking then there is no brakelight signal at all. Third, there is an appreciable and demonstrable reaction time between when a vehicle operator observes the hazardous situation requiring emergency action and when the operator physically transfers his foot from the accelerator to the brake pedal to activate the brake signal light.

The presently disclosed Highway Hazard Warning Sign Signal permits the issuance of a distinctive rearward warning signal substantially instantaneously with the sense of danger. Furthermore, the warning will be transmitted even though the operator of the motor vehicle does not brake the vehicle as part of the reaction response.

The present invention is primarily designed to obviate the so-called tailgate or blindgate type motor vehicle accidents which occur under many situations, for example when an obstruction such as a stalled car, highway defect or highway debris is presented to a driver. Such situations as the blindgate dilemma most frequently occur on modern multiple lane high speed highways with devastating results.

An advantage of the present application is primarily obtained by the design and positioning of the switch closely associated with the steering wheel of the modern day motor vehicle. The switch disclosed in the present invention is actuated essentially by the grip of the operator on the vehicle steering wheel so that the instinctive natural response of a driver entering a situation where there is impending danger is to grip or grasp the steering wheel tightly (the white knuckle reaction) and this signal activates the switch essentially instantaneously with the sense of or observation of the danger.

In the present situation the instinctive grip of the operator of the vehicle most probably would affect the subconscious activation of the signal before the driver consciously initiated any other emergency reaction response. Should the signal of the present invention be activated inadvertently it can be deactivated promptly by the simple expedient of removal of the operator's grip on the signaling device.

The structure of the sign signal is an optical replicate of the experience absorbed by a driver living through his encounter with a highway hazard. A prisoner of his moving vehicle, the driver experiences two conscious sense impressions. One is the sense of movement closing the space between himself and the hazard. The other is the increasing intensive perception of the hazard itself.

An object of the invention is to transfer these two qualities—spatial and intensive—to the sign signal. The spatial dimension is accomplished by the illusion of light converging from perimeter sources to an attention point. The intensive effect is achieved by progressively increasing illumination reaching crescendo at the attention point.

Other objects and a fuller understanding of this invention may be had by referring to the following description and claims, taken in conjunction with the accompanying drawings, which:

Figures 2, 3:
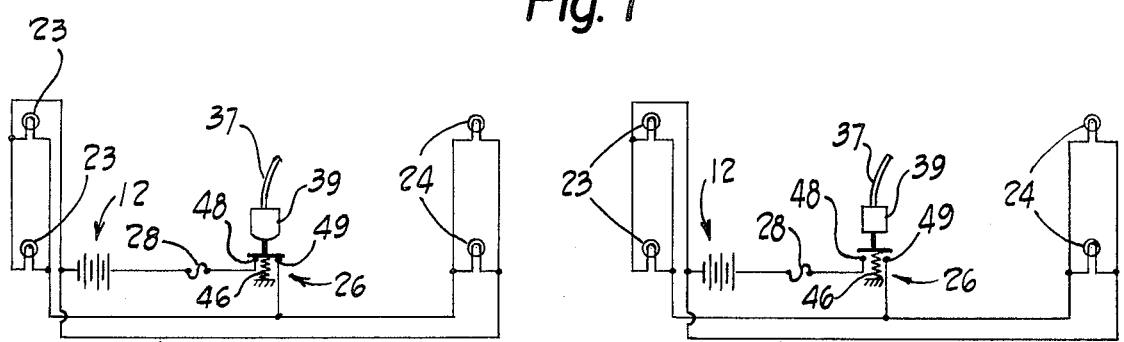
FIG. 2 is an electrical diagram illustrating the electrical circuitry applied to the automobile of FIG. 1 in order to operate the present invention and illustrating the switch of the circuit in closed position so as to energize the hazard warning sign signal.
FIG. 3 is the same as FIG. 2, however illustrating the switch in open condition so as to deenergize the warning signal.
Figures 4, 5:
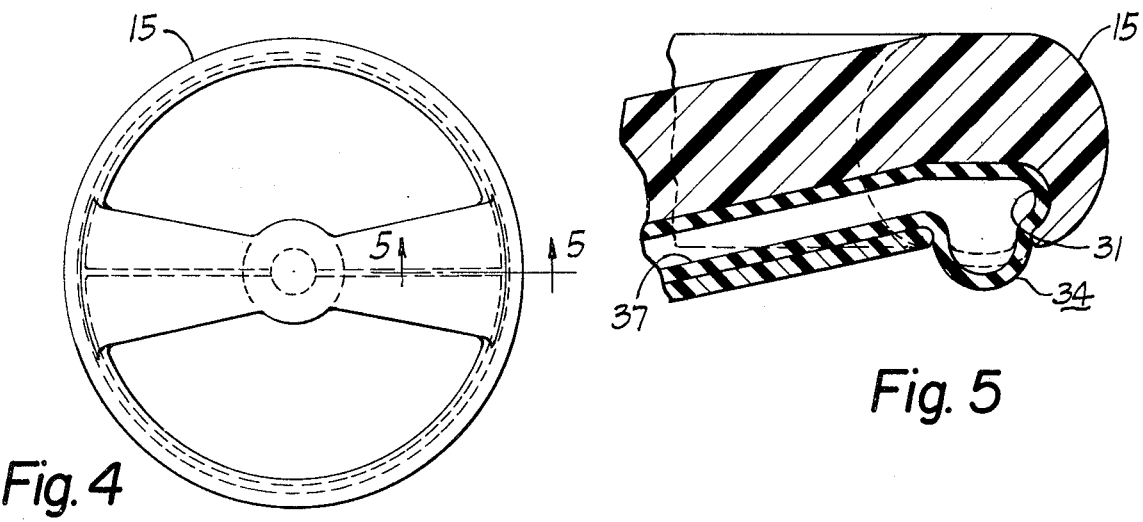
FIG. 4 is a plan view of the steering wheel of the vehicle shown in FIG. 1.
FIG. 5 is a view taken generally along the line 5—5 of FIG. 4.
Figure 6:
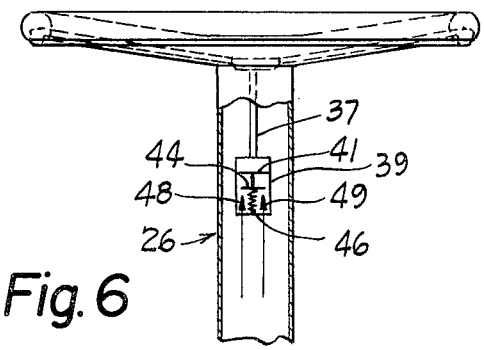
FIG. 6 is a generally elevational view of the structure of FIG. 4 and illustrating the switch of the present invention as being open so as to deenergize the electrical circuit of FIGS. 2 and 3 and it is in its deenergized condition because the fluid actuating device shown in FIG. 5 is unactuated by an operator of the vehicle.
Figure 7:
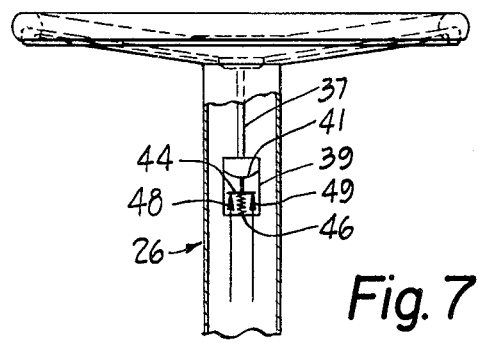

FIG. 7 is a view similar to FIG. 6, however illustrating the fluid actuating means of FIG. 5 as being actuated by an operator of the automobile to move the swtich to closed position so as to energize the electrical circuit means in a manner illustrated in FIG. 2 so as to energize the warning signal and warn drivers of other vehicles particularly those following closely behind of the presence of a dangerous situation.

Figure 8:
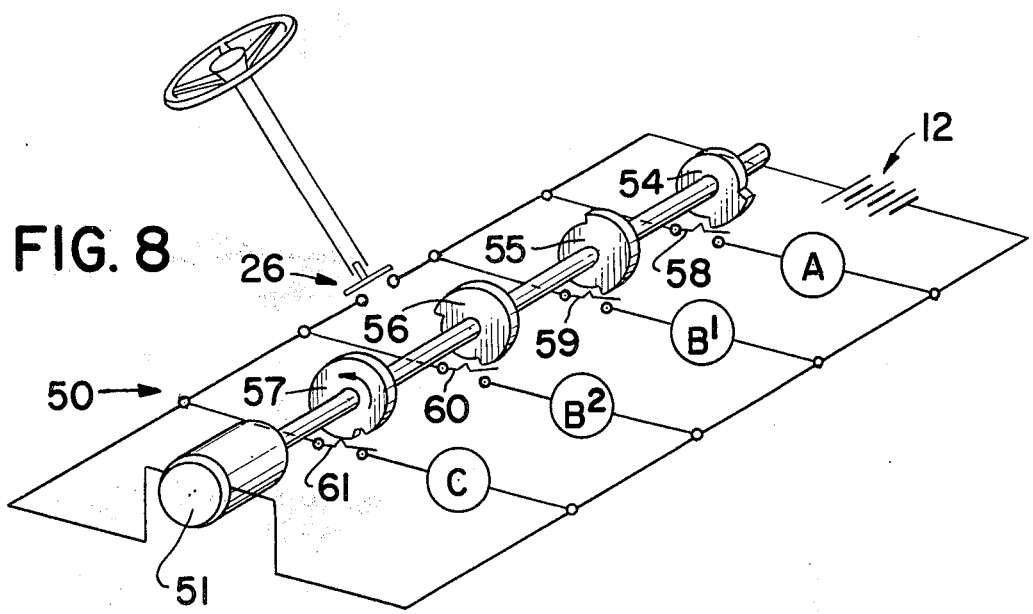
Figure 9:
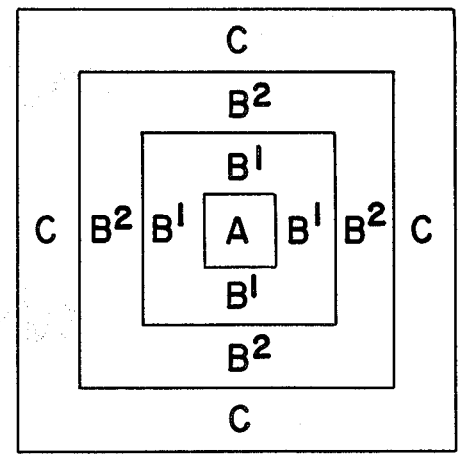
Figure 10:
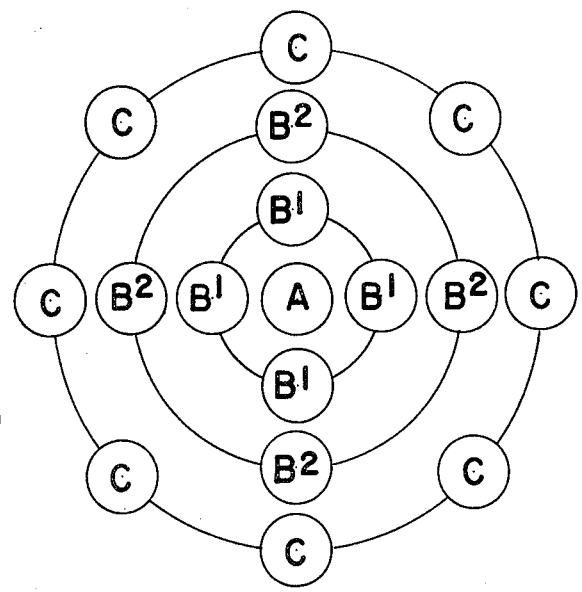

FIG. 8 is a sectional view of the parts of a conventional multiple cam timer switch which relate to the operation of the warning sign signal structure. FIG. 8 also illustrates the relation of the timer switch to the switch means 26 and the steering wheel 15;

FIG. 9 is a schematic view of the warning sign signal in rectangular structure. The teaching of FIG. 9 would apply to triangular, pentagonal and other such sided structures; and FIG. 10 is a schematic view of the sign signal in circular structure. The teaching of FIG. 10 would apply to forms of elliptical structures.

The teaching of the structure of FIGS. 9 and 10 may also be applied in combinations or in sections. Both figures illustrate a structure of a St. George cross, which could be adapted to a St. Andrew cross. Furthermore either the horizonal section or the vertical section of the St. George cross would accomplish a partial sectional teaching.

Figure 1:
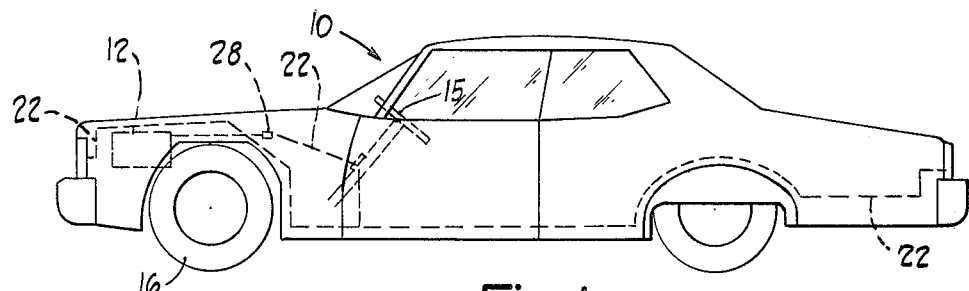
FIG. 1 is an elevational view of an automobile illustrating the general components of the same which are applicable to the present invention.

The motor vehicle and the specific electrical circuitry associated therewith in order to accomplish the teachings of the present invention are seen in FIGS. 1, 2, 3, 8, 9 and 10 of the drawings. It will be understood by those skilled in the art that the electrical circuitry common to present day motor vehicles will also be present in vehicles utilizing the teachings of the present invention, however only the circuitry essential to the operation of the present invention has been disclosed herein for clarity and for more ease in understanding by the reader of the present disclosure. FIG. 1 illustrates a motor vehicle 10 carrying the normal twelve volt battery 12 and also including a steering wheel 15 connected to mechanism for appropriately steering the vehicle through means of the front wheels 16. This detailed construction has not been shown herein because it is not necessary for a complete understanding of the invention. FIGS. 2 and 3 illustrate the electrical circuit means 22 necessary for a proper operation of the present disclosure and the electrical circuit means disclosed herein includes two warning signals 23 at the front portion of the vehicle and two warning signals 24 at the rear portion of the vehicle. The electrical circuitry of FIGS. 2 and 3 is identical with the exception that switch means 26 illustrated in FIG. 2 is illustrated in closed condition so as to electrically energize the warning signals 23 and 24 through the electrical connections to battery 12 and in FIG. 3 the switch means is located in open condition so that the warning signals 23 and 24 are not illuminated. A conventional fuse 28 is illustrated in the circuit. This same circuitry is broadly illustrated in FIG. 1 by means of the dotted lines 22 and it will be understood that is is preferred that the chassis of the motor vehicle include the electrical conducting means of the electrical circuit means illustrated in FIGS. 2 and 3.

FIGS. 4–7 illustrate the mechanical-fluid means associated with the steering wheel 15 for actuating the switch means 26 between open condition in which it is seen in FIGS. 3 and 6 and closed condition in which it is seen in FIGS. 2 and 7. FIG. 5 is a cross-sectional view taken through the steering wheel illustrated in FIG. 4 and is on a somewhat enlarged scale and illustrates a bladder-like member 31 of a flexibly resilient material such as rubber built into the confines of the steering wheel and having a portion 34 normally extending through an aperture which extends preferably throughout the entire 360° extent of the steering wheel. The fully extended position of the bladder-like member 31 is illustated in full lines in FIG. 5 and the dotted line position illustrate the position of this member when compressed or engaged by the fingers of an operator of the vehicle. The confines of the bladder-like member 31 are communicated by way of conduit means 37 to a switch housing 39 which carries the working components of the switch means 26. A diaphragm 41 is mounted in the upper portion of the switch housing 39 and carries a movable contactor 44 which is normally biased by means of a spring 46 to open condition. When the bladder-like member is appropriately engaged by an operator of the motor vehicle the volume of the bladder-like member is decreased causing a fluid signal (pneumatic in this embodiment) to be transmitted to the diaphragm 41 which causes it to be depressed downwardly or from the position shown in FIG. 6 to the position shown in FIG. 7 which causes the contactor 44 to move downwardly against the biasing of spring 46 which causes the contactor to engage contacts 48 and 49 therefore closing the electrical circuit or putting it in the condition illustrated in FIG. 2 of the drawings which causes energization of the warning signals 23 and 24.

A release of the bladder-like member 31 by an operator of the device will cause the diaphragm to move back to the position illustrated in FIG. 6 with opening of the contacts and subsequent deenergization of the electrical circuitry. In claiming the invention the actuating means and switch means may broadly both be referred to as switch means.

FIG. 8 illustrates that the switch means 26 is connected to a timer switch 50 which unit is an accessory to the host vehicle for the invention. Since the art comprises a wide variety of suitable state of the art timer switch means, it is indifferent to the invention whether the accessory unit is multiple cam recycling, photoelectric time delay, a combination of time relays, transistorized solid state, or other. In order to demonstrate the continuity from the switch means, through a conventional timer switch, to the structure of the sign signal, a conventional multiple cam timer switch 50 has been selected and depicted. Since such units are well known in the art, it is described only briefly herein. The unit is composed of a direct current motor 51 which actuates the multiple cam mechanism to make and break the current to particular electrical lamps or groups of lamps A, $B^1$, $B^2$ and C. FIG. 8 illustrates a multiple cam timer switch programmed for gear and cam adjustments for different durations of current to the particular component of the sign signal in a cyclic manner. The cam units 54–57 operate successively the switches 58–61 which respectively energize lamps A, $B^1$, $B^2$ and C.

FIGS. 9 and 10 illustrate the structure and operation of the three separate components of the sign signal. The components are: Attention Point (A); Medial (B2–B1); and Perimeter (C). The Attention Point consists of a single light source. The Medial component consists of one or more concentric bands of multiple sources of illumination of any shape surrounding the Attention Point. The Perimeter component consists of one band of multiple sources of illumination surrounding and of the same shape as the Medial component. The three components are illuminated successively as follows: Perimeter (C) and hold; Medial (B2–B1) and hold; Attention Point (A) and hold; OFF: recycle until released.

It will be understood by those reading this disclosure that the light sources may be of some particular color or the different components may each be of a different color without departing from the spirit or scope of this invention. It will also be understood by those skilled in the art that the several bands of light sources may be separated by walls so that light from one band does not laterally diffuse into another band. This can best be visualized by reference to FIG. 9 where the vertically and horizontally extending lines represent walls which separate lights C from $B^2$; $B^2$ from $B^1$; and $B^1$ from A.

FIG. 8 illustrates the arrangement which is utilized for the purpose of controlling the energization of the component light sources of FIGS. 9 and 10 in the manner explained. The electrical circuitry of components C, $B^2$, $B^1$, and A are independently connected to the electrical circuitry as shown and described in connection with FIG. 8. The successive illumination from the Perimeter through the Medials to the Attention Point creates the illusion of light converging to the Attention Point. The same successive illumination increases the cumulative candle power of the warning sign signal reaching crescendo at the Attention Point. The spatial dimension and the intensive effect generate positive visual reinforcement each for the other. This intrinsic reinforcement projects the signal of the sign to achieve a unique distinctive unmistakable visual warning to alert the viewer to the possibility of an emergency.

It will therefore be apparent to those skilled in the art that the switch actuating means utilized herein to convey the warning signal to followers of the vehicle, is in effect an extension of the operator's body and the instinctive reaction time or reaction response upon sensing danger causes a gripping of the vehicle wheel by the operator therefore essentially instantaneously transmitting this to the switch means which causes energization of the warning signals thereby more appropriately conveying a warning to following vehicles. It will be appreciated by those skilled in the art that modifications of the present actuating means in conjunction with the steering wheel of the vehicle may be accomplished without substantially departing from the spirit and scope of the disclosed invention.

Although this invention has been described in its preferred form with a certain degree of particularity, it is understood that the present disclosure of the preferred form has been made only by way of example and that numerous changes in the details of construction and the combination and arrangement of parts may be resorted to without departing from the spirit and the scope of the invention as hereinafter claimed.

What is claimed is:

1. A highway hazard warning signal for use with a motor vehicle having a driver's compartment and a steering wheel including in combination a plurality of illumination means, a first of said plurality of illumination means being located at a generally central position on said signal, a second of said plurality of illumination means being arranged annularly around said first plurality, a third of said plurality of illumination means being arranged annularly around said second plurality, and means for energizing said plurality of illumination means progressively from said third to said second to said first plurality and then repeating the sequence.

2. A highway hazard warning signal as claimed in claim 1 wherein said recited plurality of illumination means are separated from each other so that light from one is substantially prevented from diffusing into another.

3. A highway hazard warning signal as claimed in claim 1 wherein said means for energizing said plurality of illumination means is initiated from the driver's compartment of the motor vehicle.

4. A highway hazard warning signal as claimed in claim 3 wherein said means for energizing comprises switch means associated with the steering wheel and actuated by gripping the steering wheel by an operator of the vehicle.

* * * * *